United States Patent [19]
Bogenschutz

[11] 3,946,642
[45] Mar. 30, 1976

[54] HYDRAULIC BRAKE ACTUATING AND LOCKING DEVICE

[75] Inventor: Thomas M. Bogenschutz, Clayton, N.Y.

[73] Assignee: General Signal Corporation, Rochester, N.Y.

[22] Filed: Nov. 21, 1974

[21] Appl. No.: 525,787

[52] U.S. Cl. .......................... 92/24; 92/27; 92/113; 303/89
[51] Int. Cl.² ........................................ F15B 15/26
[58] Field of Search ............... 92/14, 18, 23, 24, 27, 92/28, 113; 188/165; 303/89

[56] References Cited
UNITED STATES PATENTS

| | | | |
|---|---|---|---|
| 2,259,815 | 10/1941 | Greve | 92/14 X |
| 2,378,103 | 6/1945 | Rappl | 92/14 X |
| 2,815,736 | 12/1957 | Wright | 92/24 X |
| 2,923,278 | 2/1960 | Katzberg | 92/28 X |
| 3,160,078 | 12/1964 | Hiemstra | 92/18 X |
| 3,182,565 | 5/1965 | Millard | 92/24 X |
| 3,203,513 | 8/1965 | Allen | 188/170 |
| 3,350,987 | 11/1967 | Johnson | 92/24 |
| 3,353,455 | 11/1967 | Berry | 188/170 X |
| 3,472,124 | 10/1969 | Roselius | 92/24 X |
| 3,498,182 | 3/1970 | Sheffer | 92/24 X |
| 3,605,568 | 9/1971 | Nepp | 92/28 X |

*Primary Examiner*—Martin P. Schwadron
*Assistant Examiner*—Abraham Hershkovitz
*Attorney, Agent, or Firm*—Harold S. Wynn

[57] ABSTRACT

A hydraulic brake actuating and locking device is provided for applying brakes of a vehicle comprising an elongated brake cylinder having a tubular push rod axially operable therein for actuating the brakes and a hydraulically controlled locking device disposed within the tubular push rod and operable when rendered effective for acting on the inner periphery of the push rod to restrain the push rod against axial movement relative to the brake cylinder. The locking device is selectively actuated in accordance with the movement of a locking wedge within the push rod by a hydraulically operated locking piston.

1 Claim, 2 Drawing Figures

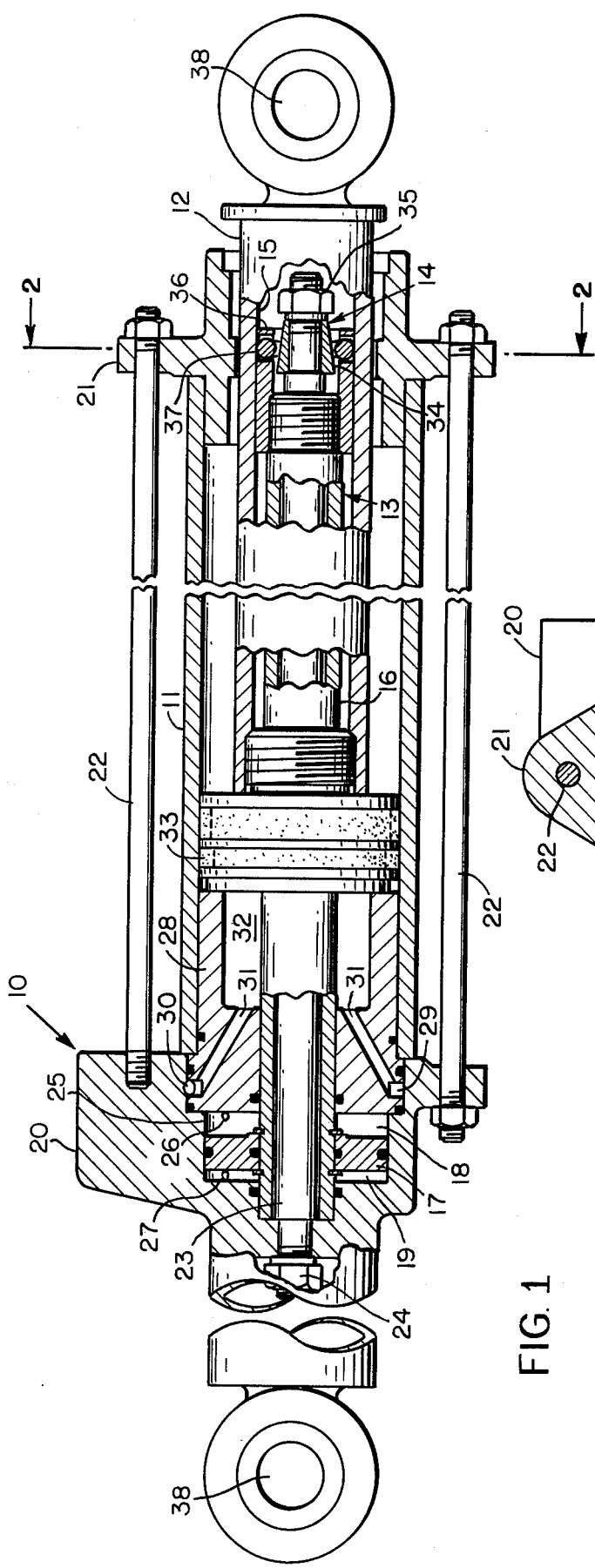
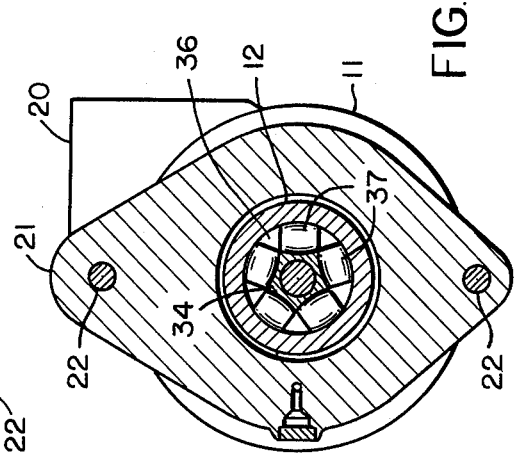
FIG. 1
FIG. 2

HYDRAULIC BRAKE ACTUATING AND LOCKING DEVICE

BACKGROUND OF THE INVENTION

This invention relates to hydraulic brake actuating and locking devices, and while the invention is subject to a wide range of applications, it will be particularly described as a brake cylinder having a hydraulically operated lock for its push rod.

The present invention is particularly useful in a hydraulic braking system such as is disclosed, for example, in the Engle U.S. Pat. No. 3,508,794, issued Apr. 27, 1970, and assigned to the same assignee as is the present invention. This patent is incorporated by reference in the present application. According to the patent, braking of a vehicle is selectively rendered effective by fluid braking pressure applied to brake cylinders either by conventional service brake control or by a fluid operated hand brake control system for parking purposes, and the like.

Because of its being desirable to maintain parking brakes applied for long periods of time when a car is unattended, a system is provided according to the above patent for mechanically locking braking push rods in their extended braking positions relative to their associated brake cylinder. This locking mechanism is selectively rendered effective or ineffective by hydraulic hand brake control. Improvements in this locking mechanism are disclosed in the Engle U.S. Pat. No. 3,586,138, issued June 22, 1971, also assigned to the same assignee as the present invention and hereby incorporated by reference in the present application.

In both of the above patents, the mechanical locking is accomplished by clamping the outer periphery of the push rods to prevent movement relative tto the associated brake cylinder. Repeated use of this locking device, together with mechanical strains such as the coupling of other cars to a car having its brakes locked can wear the periphery of the push rod to an extent to require maintenance in order to prevent damage to seals and/or push rod bearings.

An object of the present invention is to provide a hydraulic brake actuating and locking device which substantially obviates one or more of the limitations and disadvantages of the described prior arrangements.

Another object of the present invention is to provide a hydraulic brake actuating and locking device obviating the necessity for clamping the outer periphery of a push rod in order to provide axial locking of the push rod relative to the brake cylinder.

Other objects, purposes, and characteristic features of the present invention will be in part obvious from the accompanying drawings, and in part pointed out as the description of the invention progresses.

SUMMARY OF THE INVENTION

A hydraulic brake actuating and locking device for applying brakes of a vehicle is provided comprising an elongated brake cylinder having a tubular push rod axially operable therein adapted to operate brakes of a vehicle and having a hydraulically controlled locking device of an improved structure wherein the locking device is disposed within the tubular push rod and operable when rendered effective for acting on the inner periphery of the push rod to restrain movement of the push rod relative to the brake cylinder. The locking device within the push rod is selectively actuated in accordance with axial movement of an associated lock rod in response to actuation of a hydraulically operated locking piston.

For a better understanding of the present invention, together with other and further objects thereof, reference is had to the following description, taken in connection with the accompanying drawings, while its scope will be pointed out in the appending claims.

IN THE DRAWINGS

FIG. 1 is an axial sectional view with some parts broken away of a hydraulic brake actuating and locking device according to a preferred embodiment of the present invention; and FIG. 2 is a view partly in cross section taken along the line 2—2 of FIG. 1.

With references to FIG. 1, a hydraulic brake actuating and locking device 10 is disclosed for applying brakes of a vehicle comprising an elongated brake cylinder 11 having a tubular push rod 12 axially operable therein for actuating the brakes of a vehicle and a hydraulically controlled locking apparatus 13 is provided for selectively locking axial movement of the push rod 12 relative to the brake cylinder 11. The improved locking apparatus 13 comprises an annular locking device 14 disposed within the tubular push rod 12 and operable when rendered effective for acting on the inner periphery 15 of the push rod 12 to restrain the push rod 12 against axial movement relative to the brake cylinder 11. Control apparatus for the locking device 14 comprises a tubular moveable lock rod 16 that extends partly within the push rod 12 and is responsive alternately to locking and unlocking hydraulic pressure controls applied to a locking piston 17 for selectively rendering the locking apparatus effective or ineffective in accordance with whether the piston 17 is actuated by hydraulic pressure in a locking chamber 18 on in an unlocking chamber 19.

Considering the hydraulic brake actuating and locking device 10 more specifically, the brake cylinder 11 is clamped between a pressure end flange 20 and a push rod bearing end flange 21 by tie rods 22. A fixed locking rod 23 is disposed partly within the tubular push rod 12 and is secured to the pressure end flange 20 by a nut 24. The moveable lock rod 16 is tubular in shape and co-axial with the fixed lock rod 23 and operable axially on the outer periphery of the fixed lock rod 23. The locking piston 17 is secured to the outer periphery of the moveable lock rod 16 near its left hand end and is disposed in a cavity 25 in the pressure end flange 20. The locking piston 17 divides the cavity 25 into respective locking and unlocking pressure chambers 18 and 19, respectively. The chamber 18 has a locking port 26 adapted for connection to a locking source of hydraulic fluid pressure, and the chamber 19 has an unlocking port 27 that is adapted for connection to an unlocking source of hydraulic pressure.

A pressure cup 28 is clamped to the pressure end flange 20, the pressure cup 28 comprising an annular chamber 29 having a port 30 that is adapted for receiving hydraulic brake operating pressure, the annular recess 29 being connected by suitable passages 31 to a pressure chamber 32 to the left of a braking piston 33. The braking piston 33 has a central opening for passage of the lock rods and is suitably secured to the left end of the push rod 12 as by being threaded into the tubular push rod 12. Thus the push rod 12 is axially operable relative to the braking cylinder 11 by a pressure in the chamber 32 to the left of the braking piston.

The locking device 14 within the tubular push rod 12 comprises a locking wedge 34 suitably secured to the right hand end of the fixed lock rod 23 by a nut 35. The wedge 34 is in the form of an axially tapered inner race (see FIG. 2) for a plurality of circumferentially disposed rollers 37. The wedge 34 comprises a plurality of wedge portions having concave surfaces conforming to taper of the respective rollers 37. Cooperating with the outer periphery of the wedge 34 is a ring 36 retaining roller wedge portions 37 forming a second wedge for cooperating with the wedge 34 to lock the inner periphery of the push rod 12 selectively against movement relative to the brake cylinder 11. Each of the rollers 37 is tapered axially towards its ends to conform to the inner periphery of the push rod 12.

The hydraulic brake actuating and locking device 10 is adapted for connection between brake shoes associated with wheels of adjoining axles in a railway car by the pressure end flange 20 having an opening 38 for receiving a tie bolt for connection to a brake hanger (not shown), and at the right hand end of the push rod 12, a similar opening 38 is provided for passage of a pin connecting the push rod to a brake hanger (not shown) associated with another axle as is more fully disclosed in FIG. 1 of the Engle U.S. Pat. 3,696,892 granted Oct. 10, 1972 and incorporated herein by reference.

In operation, fluid pressure for applying the brakes is applied to the port 30 and thus to the pressure chamber 32 to drive the pressure piston 33 and thus the push rod 12 to the right relative to the brake cylinder 11. If it is desireable to lock the brakes in their applied positions, fluid pressure is applied to the port 26 for actuating the locking piston 17 to the left in the chamber 25 of the end flange 20. This actuates the moveable lock rod 23 and wedges the rollers 37 between the wedge 34 associated with the fixed lock rod 23 and the inner periphery of the tubular push rod 12. This will maintain the brakes in their applied positions irrespective of the removal of fluid pressure from the left of piston 33 and removal of locking fluid pressure in chamber 18. This is because a force tending to release the brakes would tend to drive the push rod 12 within the braking cylinder 11, and this force would only tend to cause the rollers 37 to roll in a direction to wedge tigher between the wedge 34 and the inner periphery of the push rod 12 and thus maintain the brakes in their applied positions.

When it is desired to release the lock that has been applied to the inner periphery of the push rod 12 as has been described, pressure is applied to the port 27 of chamber 19, to the left of the locking piston 17, to drive the moveable locking rod 16 to the right and cause the rollers 37 to roll out of their wedging positions between the wedge 34 and the inner periphery of the push rod 12. Thus the locking is released from the push rod 12, permitting the brakes to be released.

Having thus described a hydraulic brake actuating and locking device having improved locking apparatus as a preferred embodiment of the present invention, it is to be understood that various modifications and alterations may be made to the specific embodiment shown without departing from the spirit or scope of the invention.

What is claimed is:

1. A hydraulic brake actuating and locking device for applying brakes of a vehicle comprising an elongated brake cylinder having a tubular push rod axially operable therein for actuating the brakes and a hydraulically controlled locking means for selectively locking axial movement of the push rod relative to the brake cylinder wherein improved locking and control means comprises;
    a. a brake cylinder secured between a pressure end flange at one end and a push rod bearing end flange at the other end,
    b. an annular locking device disposed within the tubular push rod and operable when rendered effective for acting on a uniform smooth inner periphery of the push rod to restrain the push rod against axial movement relative to the brake cylinder, irrespective of the extent to which the push rod is contained within the brake cylinder, the annular locking device comprising;
        1. a fixed locking rod coaxial within the push rod having a plurality of wedges disposed about the periphery thereof at one end and having its other end secured within the pressure end flange,
        2. an axially operable tubular locking rod slideable on the fixed locking rod within the push rod and carrying rollers at one end thereof adapted to be wedged between the respective wedges of the first locking rod and the inner periphery of the tubular push rod for use in locking the push rod to the fixed lock rod for preventing retraction of the push rod within the cylinder, and
        3. a piston secured on the axially operable locking rod at its other end and disposed in a pressure compartment within the pressure flange whereby the locking of the push rod can be rendered selectively effective or ineffective in accordance with the application of fluid pressure at one side or the other respectively of the locking piston in the pressure chamber.

* * * * *